US010428577B2

United States Patent
Viinonen et al.

(10) Patent No.: US 10,428,577 B2
(45) Date of Patent: Oct. 1, 2019

(54) ARRANGEMENT AND METHOD FOR LOADING A CARGO SPACE AND APPARATUS FOR FORMING A PROTECTIVE WALL IN THE CARGO SPACE

(71) Applicant: ACTIW OY, Naarajarvi (FI)

(72) Inventors: Reijo Viinonen, Pieksamaki (FI); Otto Utriainen, Montola (FI)

(73) Assignee: Actiw Oy, Naarajarvi (FI)

( * ) Notice: Subject to any disclaimer, the term of this patent is extended or adjusted under 35 U.S.C. 154(b) by 378 days.

(21) Appl. No.: 15/124,131

(22) PCT Filed: Mar. 17, 2015

(86) PCT No.: PCT/FI2015/050175
§ 371 (c)(1),
(2) Date: Sep. 7, 2016

(87) PCT Pub. No.: WO2015/140404
PCT Pub. Date: Sep. 24, 2015

(65) Prior Publication Data
US 2017/0016273 A1    Jan. 19, 2017

(30) Foreign Application Priority Data
Mar. 17, 2014 (FI) ...................... 20145245

(51) Int. Cl.
*B65G 67/20* (2006.01)
*E06B 9/00* (2006.01)
*B65G 69/22* (2006.01)

(52) U.S. Cl.
CPC ............... *E06B 9/00* (2013.01); *B65G 67/20* (2013.01); *B65G 69/22* (2013.01); *B65G 2201/0267* (2013.01); *B65G 2207/48* (2013.01)

(58) Field of Classification Search
CPC ....................................... B65G 67/20
(Continued)

(56) References Cited

U.S. PATENT DOCUMENTS 3,704,798 A * 12/1972 Carpenture, Jr. ......... B60P 1/38
414/390
3,998,343 A * 12/1976 Fors ....................... B60P 1/006
414/501

(Continued)

FOREIGN PATENT DOCUMENTS

| CN | 88101498 | 10/1988 |
| CN | 1248209 | 3/2000 |

(Continued)

OTHER PUBLICATIONS

JP 2005-170589 A: English machine translation. Patent document publication date: Jun. 30, 2005. Retrieved: Nov. 16, 2018 from Espacenet. (Year: 2005).*

(Continued)

*Primary Examiner* — Jonathan Snelting
(74) *Attorney, Agent, or Firm* — Fildes & Outland, P.C.

(57) ABSTRACT

An arrangement for loading a cargo space includes a transfer element as part of the transfer apparatus, which is arranged to move, together with load units to be arranged on top of it, into a cargo space and back out of there leaving the load units in the cargo space and means for forming a protective wall between the structure defining the cargo space and the load units. The forming of the protective wall is synchronized with the movement of the transfer element. In addition, an apparatus is disclosed for forming a protective wall in a cargo space and a method for loading a cargo space.

13 Claims, 8 Drawing Sheets

(58) Field of Classification Search
USPC .................................................. 414/400
See application file for complete search history.

(56) References Cited

U.S. PATENT DOCUMENTS

| | | | | |
|---|---|---|---|---|
| 4,054,226 | A * | 10/1977 | Bjelland | B65D 90/047 220/1.6 |
| 4,832,559 | A | 5/1989 | Gebbardt | |
| 4,892,456 | A * | 1/1990 | Hodgetts | B60P 1/38 198/499 |
| 5,156,518 | A * | 10/1992 | VanMatre | B60P 1/006 414/507 |
| 5,193,710 | A * | 3/1993 | Podd, Sr. | B65D 90/047 220/1.5 |
| 6,367,615 | B1 | 4/2002 | Helmner | |
| 7,866,932 | B1 | 1/2011 | Pool | |
| 9,120,632 | B2 * | 9/2015 | Uhrick | B65G 67/20 |
| 2006/0078410 | A1 | 4/2006 | Frankel | |
| 2009/0212550 | A1 | 8/2009 | Albers | |
| 2010/0296902 | A1 * | 11/2010 | Aschpurwis | B60P 1/365 414/499 |
| 2011/0027060 | A1 * | 2/2011 | Dunn | B60P 1/006 414/808 |
| 2013/0183134 | A1 | 7/2013 | Adams et al. | |

FOREIGN PATENT DOCUMENTS

| | | |
|---|---|---|
| JP | 2005-170589 | 6/2005 |
| WO | 2005/080132 | 9/2005 |
| WO | 2007/071831 | 6/2007 |
| WO | 2009/107084 | 9/2009 |

OTHER PUBLICATIONS

Chinese Office Action in Chinese Application No. 201580013934.1 dated Jun. 19, 2017.
International Search Report, International Application No. PCT/FI2015/050175, dated Jul. 10, 2015.
English language abstract of JP 2005-170589.

* cited by examiner

ARRANGEMENT AND METHOD FOR LOADING A CARGO SPACE AND APPARATUS FOR FORMING A PROTECTIVE WALL IN THE CARGO SPACE

CROSS-REFERENCE TO RELATED APPLICATION

This application claims benefit of priority from International Patent Application No: PCT/FI2015/050175 filed Mar. 17, 2015, which claims benefit of Finnish Patent Application No. 20145245 filed Mar. 17, 2014, both of which are incorporated by reference in their entirety.

FIELD OF THE INVENTION

The present invention relates to an arrangement for loading a cargo space, which comprises
- a transfer element as part of the transfer apparatus, which is arranged to move, together with the load units to be arranged on top of it the transfer element, into the cargo space and back out of the cargo space, leaving the load units in the cargo space,
- means for forming a protective wall between the structure defining the cargo space and the load units.

In addition, the invention also relates to a corresponding method for loading a cargo space and an apparatus for forming a protective wall in the cargo space.

BACKGROUND OF THE INVENTION

WO publication number 2005080132 discloses a method and transfer apparatus for loading products to be transported into a cargo space. In the transfer apparatus described, a transfer plate, more generally a transfer element, is utilized, on top of which the load is first formed. Next, the load, together with the transfer plate, is pushed into the cargo space. After that, the transfer plate is pulled out from under the load. During the pulling, the load is supported, so that it will remain in the cargo space.

In the method, the products are first of all loaded onto the transfer plate, which is outside the cargo space and will be pushed into the cargo space. After this, the products are moved inside the cargo space by pushing the transfer plate inside along the bottom of the cargo space. Finally, the products are supported from the open side and the transfer plate is pulled out from between the bottom of the cargo space and the products. In the transfer apparatus, there is a frame and a transfer plate, more generally a moveable transfer element, supported on it. The transfer apparatus also includes transfer means for moving the transfer plate and the products into the cargo space and for pulling the transfer plate out of from between the bottom of the cargo space and the products. Correspondingly, WO publication number 2007071831 discloses an application of a transfer plate for loading various load pallets into a cargo space.

Controlling the transfer plate can be difficult, indeed often impossible, when pushing the transfer plate together with its loads into the cargo space and/or also when pulling it out. This can lead, for example, to damage to the load and also to the cargo space. In addition to this, in the cargo space there may be, for example, various kinds of damage to its walls. Some examples are dents, tears formed in them, and even places that substantially protrude from the wall surface. They may also damage the load units and/or the transfer element, for example, during transferring.

A container loader is known from U.S. Pat. No. 7,866,932, in which protective walls are used between the material being loaded and the side walls of the container. The loader is intended for the loading of bulk materials. The protective walls are intended to receive the pressure caused by the material being pushed to the container in the loading stage, which causes, for example, the lateral spreading of the material. This makes its construction and operation complicated and heavy.

SUMMARY OF THE INVENTION

The invention is intended to create an arrangement for loading a cargo space and also a corresponding method, by means of which the load being loaded and also the structures of the cargo space can be protected by a simple structural solution. In addition, the invention is intended to create an apparatus for forming a protective wall in the cargo space, which is simple to implement. The arrangement according to the invention for loading a cargo space is characterized by a transfer element as part of the transfer apparatus, which is arranged to move, together with load units to be arranged on top of the transfer element, into the cargo space and back out of the cargo space leaving the load units in the cargo space; and at least one curtain element for forming a protective wall between the structure defining the cargo space and the load units; and at least one reel means for reeling in the curtain element and discharging the curtain element from the reeled-in position by means of the movement effect created by the transfer element.

In addition, another object of the invention is to provide an apparatus for forming of a protective wall in a cargo space which is arranged to be loaded by using a transfer element, belonging to a transfer apparatus, which is arranged to move, together with load units to be arranged on top of transfer element, into the cargo space and out of the cargo space, while the load units remain in the cargo space, and which apparatus comprises at least one curtain element for forming a protective wall between the structure defining the cargo space and the load units, and at least one reel means for reeling in the curtain element and discharging the curtain element from the reeled-in position by means of the movement of effect created by the transfer element.

In addition, another object of the invention is to provide a method for loading a cargo space, comprising steps of: arranging load units on top of a transfer element outside the cargo space; and moving the load units on the transfer element into the cargo space, after which the transfer element is moved out of the cargo space while the load units remain in the cargo space; and forming a protective wall between a structure defining the cargo space and the load units while moving the load units into the cargo space.

The arrangement, apparatus and method according to the invention is simple and also operation-friendly. When the protective wall is formed along with the movement of the transfer element, it can be arranged in the cargo space only when it is needed, i.e. mainly simultaneously when moving the load units into the cargo space. Thus, the protective wall will not be, for example, in the way, if the transportation means forming the cargo space is arranged in connection with the transfer apparatus. This substantially reduces the risk of damaging the protective wall. Correspondingly, the protective wall can also be moved out of the cargo space in synchronization with the movement of the transfer element.

The protective wall is arranged to be formed in the cargo space by means of the movement created by the transfer element. This too simplifies substantially the structural implementation of the arrangement. Thus, the formation of the protective wall does not need its own movement means at all. It can take place using the same movement means as those with which the movement of the transfer element is achieved. This also clarifies the outward structures of the transfer apparatus and thus reduces the number of objects that are liable to be damaged.

According to one embodiment, the protective wall can be formed between a gate belonging to the transfer apparatus and the front part of the transfer element. Thus, the protective wall will be out of the way when the load units are loaded onto the transfer element before being moved into the cargo space. Thus the arrangement makes this stage of loading more efficient, because the load units can be brought to the transfer element from a freely chosen direction. In addition, the protective wall also will not be damaged in this loading stage.

The arrangement includes at least one curtain-like element for forming the protective wall. In addition, the arrangement also includes reel means for reeling in the protective wall and discharging it from the reeled position. A reelable protective wall is compact, light, and out of the way when it is not needed. It is also simple and quick to form the protective wall from its reeled position. In addition, using a reelable protective wall maximizes the effective use of the cargo space. Minimal space is taken from the cargo space by a curtain-like and thus also thin protective wall and a greater volume of the cargo space can be kept for the load units. Other additional advantages achieved by means of the invention appear in the description portion and the characteristic features in the accompanying Claims.

BRIEF DESCRIPTION OF THE DRAWINGS

The invention, which is not restricted to the embodiments presented in the following, is described in greater detail with reference to the accompanying figures, in which FIG. 6 shows the arrangement shown in FIG. 5, with the protective wall reeled in.

DETAILED DESCRIPTION OF THE INVENTION

Figure 1:
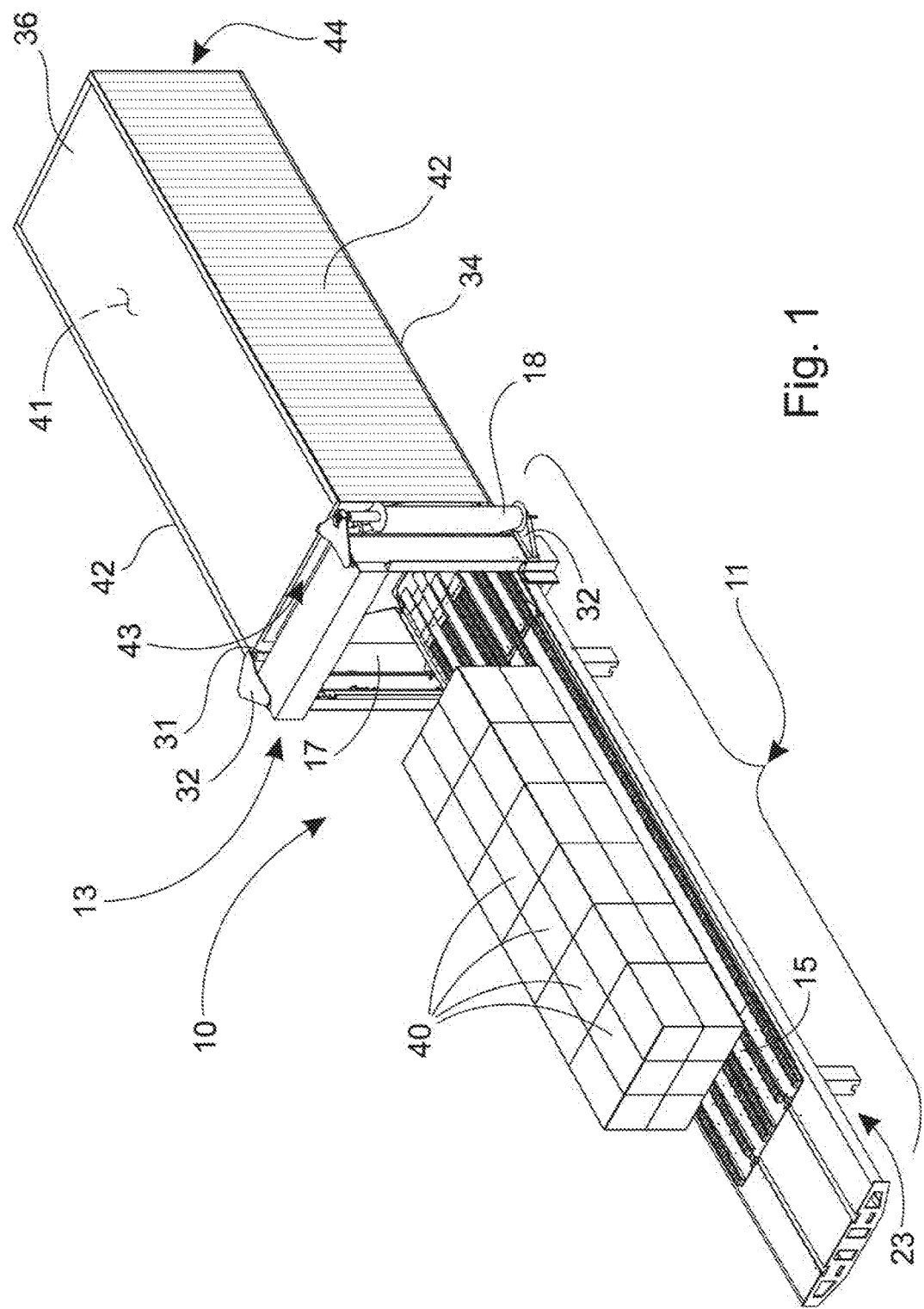
FIG. 1 shows an axonometric view of the arrangement of one embodiment, with the load formed on the transfer element and ready to be moved into the cargo space.
Figure 2:
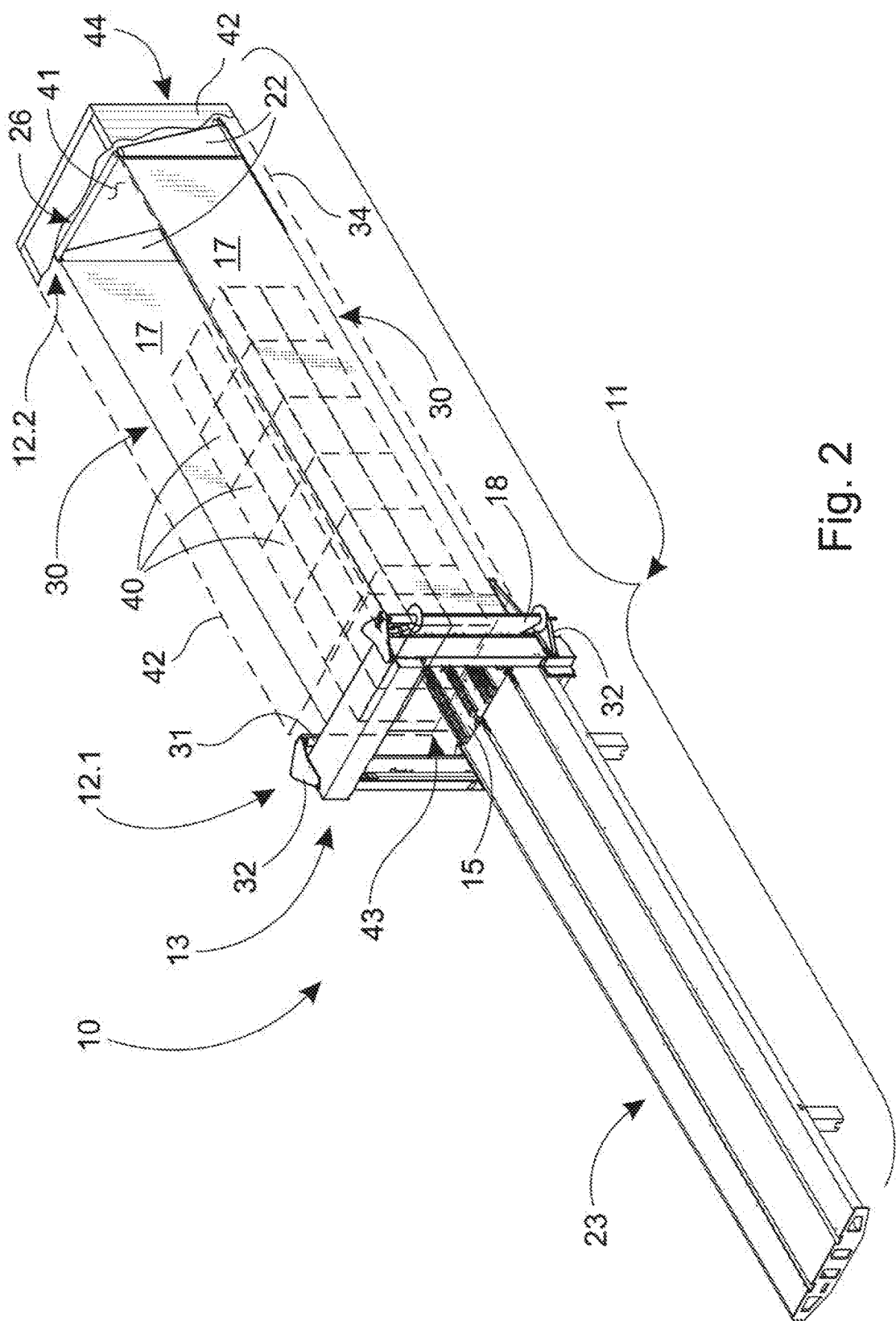
FIG. 2 shows the arrangement shown in FIG. 1, with the protective walls moved into the cargo space together with the load units.

FIGS. 1 and 2 show one example application of the arrangement for loading a cargo space 41, seen axonometrically in different situations. FIG. 1 shows the arrangement 10 with the load formed of load units 40 formed on the transfer element 15 belonging to the transfer apparatus 11 and ready to be moved into the cargo space 41. Correspondingly, FIG. 2 shows the arrangement shown in FIG. 1, with the protective walls 30 moved into the cargo space 41 together with the load units 40.

The cargo space 41 can be defined and thus delimited by, in addition to the floor structure 34, its wall structures 42 on the longitudinal sides of the cargo space 41 and also in its front part, as well by the possible roof structure 36 of the cargo space 41. At the other end of the cargo space 41 to the front part there can be, for example, an access opening able to be closed, a mouth 43 of the cargo space 41, for giving access to the cargo space 41. The loading of the cargo space 41 can be performed through this opening.

The cargo space 41 can be formed in a transportation means. Some examples of transportation means can be a container 44, or a vehicle or an object towed by one, in which the cargo space is a superstructure formed in them. Semi-trailers are an example of these towable objects. The materials of the floor 34, side walls 42, and/or roof 36 of the cargo space 41 can be, for example, steel, timber, plywood, aluminium, or composite. Due to much use, for example, the side walls 42 of the cargo space 41 can be damaged in various ways. An example of this are the marks left by the prongs of fork-lift trucks. These can be, for example, various kinds of longitudinal and sharp-edged tears in the cargo space.

For their part, the load units 40 can be, for example, piece goods. Some non-exclusive examples are sawn goods, products of the paper, pulp, and engineering industries, liquid-transportation containers, and generally all kinds of package and piece goods arranged, for example, on load pallets for transportation.

Figure 3:
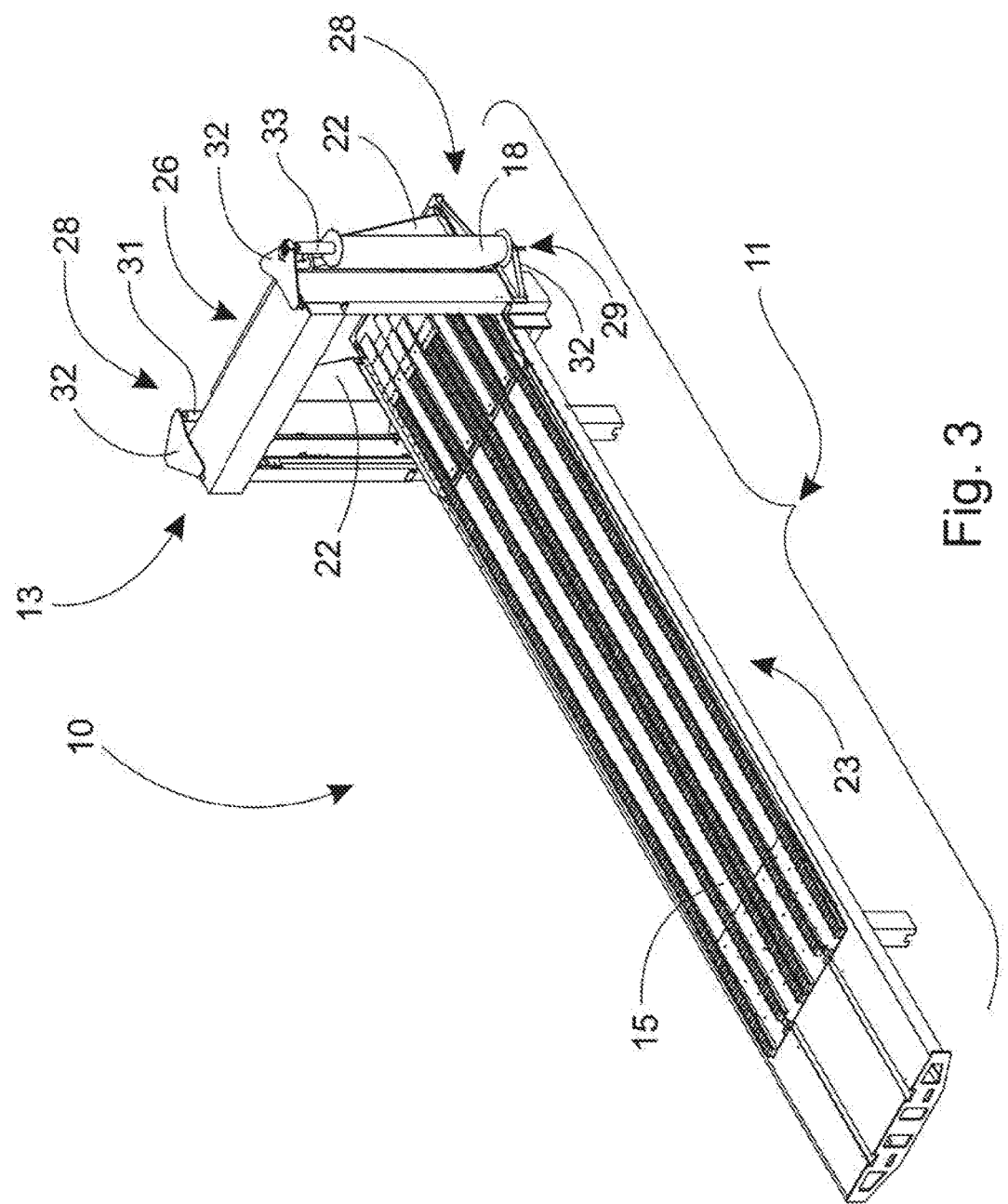
FIGS. 3 and 4 show the arrangement shown in FIGS. 1 and 2, without the load units and the cargo space.
Figure 4:
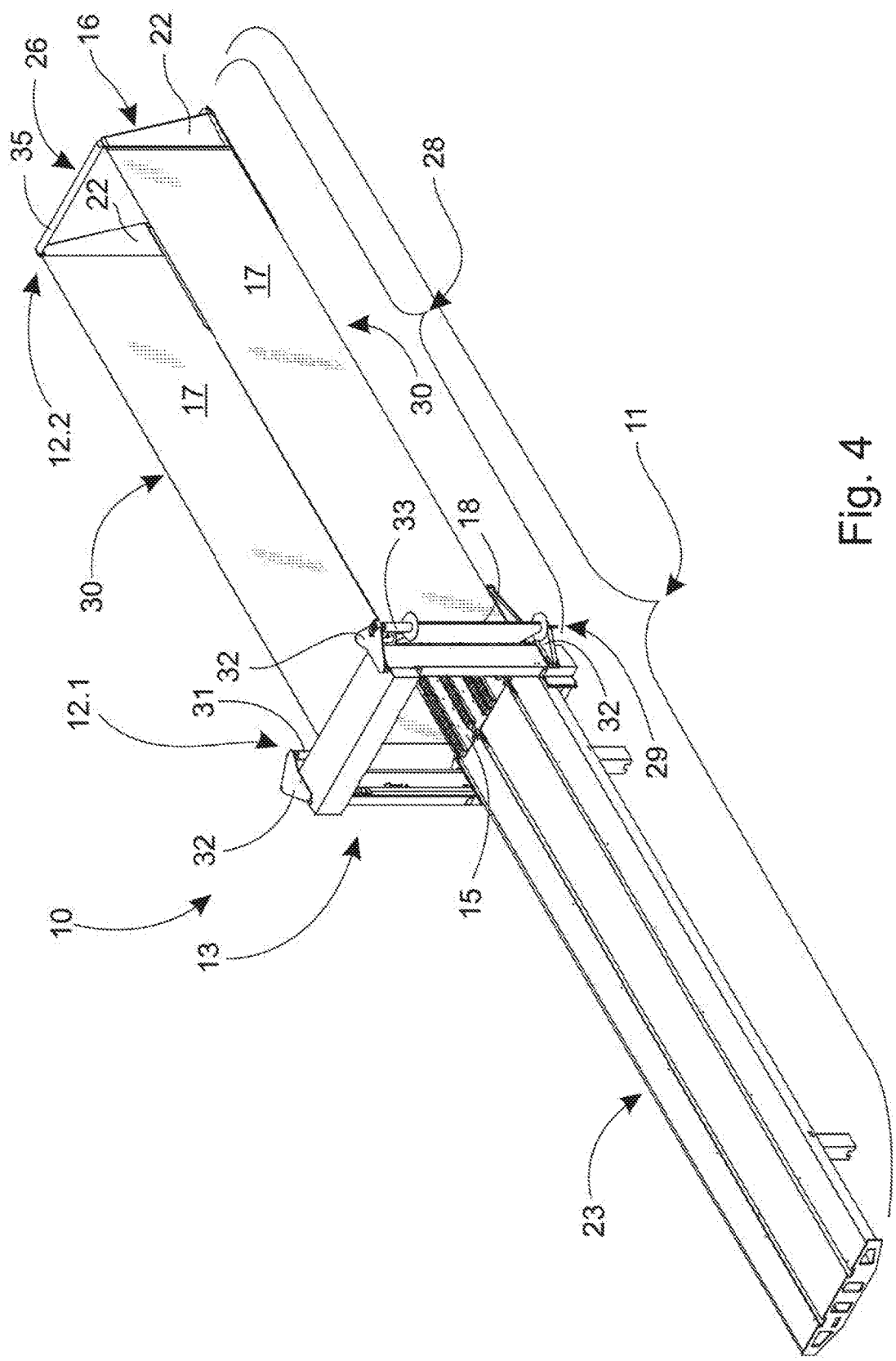

In addition to the FIGS. 1 and 2 already referred to, reference is further also made to FIGS. 3 and 4. FIGS. 3 and 4 show only the transfer apparatus 11 without the cargo space 41 and load units 40 shown in FIGS. 1 and 2. In FIG. 3, the transfer apparatus 11 is in a position, in which it is when the transfer element 15 is outside the cargo space and ready to receive load units. In FIG. 4, the transfer apparatus 11 is, in turn, in a position in which it is when the transfer element 15 is inside the cargo space and has thus transferred the load units to the cargo space. In its basic form, the arrangement 10 includes a transfer element 15 as part of the transfer apparatus 11 and means 28 for forming a protective wall 30 (FIGS. 3 and 4). In the case according to the embodiment, the transfer element 15 is a transfer plate arranged to move, which is utilized in the loading of the cargo space 41. The load units 40 can be fitted on top of the transfer plate of the transfer element 15. In addition, the transfer apparatus 11 can also include a gate 13 with accessories. The accessories of the gate 13 can include, for example, an, as such, known kind of obstacle arrangement/buffer (not shown). With its aid, the transfer element 15 can be pulled out from under the load units 40 while they remain in the cargo space 41. The transfer element 15 is arranged to travel through the gate 13.

The transfer element 15 belonging to the transfer apparatus 11 is arranged to move, together with the load units 40 to be arranged on it, into the cargo space 41. In addition, the transfer element 15 belonging to the transfer apparatus 11 is arranged to move back out of the cargo space 41, while the load units 40 remain in the cargo space 41. As can be seen from FIGS. 1 and 2, in FIGS. 3 and 4 the cargo space 41 can be arranged on the right-hand side relative to the gate 13. On the left-hand side of the gate 13 is now the base 23 of the transfer apparatus 11.

The operation of the transfer apparatus 11 and the transfer element 15 belonging to it can be, as such, known to one skilled in the art from the prior art. For example, in the embodiment shown, details of the construction of, or means for moving the transfer element 15 are not shown for the sake of simplicity. Both of these can be implemented in a manner that is, as such, known, without in any way changing the basic idea of the invention. The arrangement 10 can be applied, for example, in the applicant's loading systems marketed under the trade name LoadMatic/Plate. The application example described here is not, however, intended in any way to exclude other corresponding existing loading principles, or those only in development, from the possible applications of the invention and the scope of protection of the present application. Generally, the construction of the transfer apparatus 11 can be depicted in such a way that the gate 13 of the transfer apparatus 11 can be arranged in the mouth 43 of the cargo space 41 and the load units 40 can be arranged on the transfer element 15 on the opposite side of the gate 13 relative to the cargo space 41.

The good sliding properties possibly achieved in the transfer element 15 can sometimes also cause problems. When being pushed into the cargo space 41, the transfer element 15 may for some reason also slide laterally. The transfer element 15, the load units 40, or even a load pallet can then strike the wall structures 42 of the cargo space 41, which can lead to even serious damages. The cargo space 41 can, for example, be at a tilt, when the transfer element 15 with its load can slide to the side due to the effect of gravity. Of course, it is always attempted to set both the transfer apparatus 11, together with the transfer element 15, and the cargo space 41 in as straight and horizontal position as possible. In order to avoid damage caused, for example, by the load units 40 due to the aforementioned factors, at least one protective wall 30 is included in the arrangement 10. The protective wall 30 can be formed between the structure defining and delimiting the cargo space 41 and the load units 40. In addition, by using a protective wall 30 damages to the load units 40, caused by the structures 42 of the cargo space 41, can also be avoided.

In the case according to the embodiment shown in FIGS. 1-4, there are two protective walls 30 in the arrangement 10. The protective wall 30 can be on at least one, preferably, however, on both longitudinal sides of the transfer element 15. In this case, the protective wall 30 can be formed between both side walls 42 of the cargo space 41 and the load units to be loaded 30 into it. This can be seen very clearly from FIG. 2. There can also be only one protective wall 30, for example on only one of the side walls 42 of the cargo space 41, or even on three. A protective wall can then be formed also against the roof 36 of the cargo space 41, in addition to the side walls 42. The possibilities for forming one or more protective walls 30 are thus comprehensive.

Through the arrangement 10, it is possible to use the protective wall 30 to protect material being loaded and/or the cargo-space structures and/or the transfer element 15 from damages. This can arise, for example, in the loading situation of the material to be loaded and/or when the transfer element 15 is pulled out of the cargo space 41. The means 28 belonging to the arrangement 10 for forming the protective wall 30 can include at least one curtain-like element. Hereinafter, this is referred to only as a curtain 17. The curtain 17 forms a structure, by means of which the inner surface of the wall structure 42 of the cargo space 41 and the load units 40 are separated from each other. It acts as a protective element between the load units 40 being loaded and the structure 42 defining the cargo space 41. Thanks to the protective wall 30, the transfer element 15 belonging to the arrangement 10 together with its load can be safely pushed into the cargo space 41 without risk of their damage.

The protective wall 30, or generally the means 28 for forming a protective wall 30 are arranged in connection with the transfer apparatus 11 in such a way that the formation of the protective wall 30 is synchronized with the movement of the transfer element 15. This permits a simple implementation for the protective wall 30 and thus also for the means 28 for forming the protective wall 30. In addition, this also simplifies the operating environment, for example, when collecting the load units 40 on top of the transfer element 15. Simplification is achieved through the simple structure and compactness. One way to implement this synchronization is to arrange the protective wall 30 to be formed into the cargo space 41 by means of the movement of the transfer element 15. Thus the formation of the protective wall 30 in the cargo space 41 does not necessarily require its own operating device for moving the protective wall 30 into the cargo space 41.

The transfer element 15 of the transfer apparatus 11 can be said to have a front part 14. Here the term front part 14 means the point part of the transfer element 15. It pushes first into the cargo space 41 and correspondingly leaves the cargo space 41 last, when the transfer element 15 is moved. According to one embodiment, the protective wall 30 can be formed between the gate 13 of the transfer apparatus 11 and the front part 14 of the transfer element 15. The first end 12.1 of the protective wall 30 is then arranged in connection with the gate 13 and the second end 12.2 is arranged in connection with the front part 14 of the transfer element 15. Thus the protective wall 30 is arranged at least in part in connection with the transfer apparatus 11 and even more particularly with its transfer element 15.

The means 28 for forming the protective wall 30 can include, for example, at least two reel means 25 (FIG. 6) for reeling in the protective wall 30 and correspondingly also for discharging it from the reeled position. In addition to the reel means 25, the means 28 for forming the protective wall 30 can also include a support 26 arranged for at least one curtain 17 of the protective wall 30 in connection with the front part 14 of the transfer element 15. One end 12.2 of the protective wall 30 formed by the curtain 17 is arranged to the support 26. More generally it can, however, be said that one end 12.2 of the protective wall 30 formed by the curtain 17 is arranged in the front part 14 of the transfer element 15.

Figure 5:
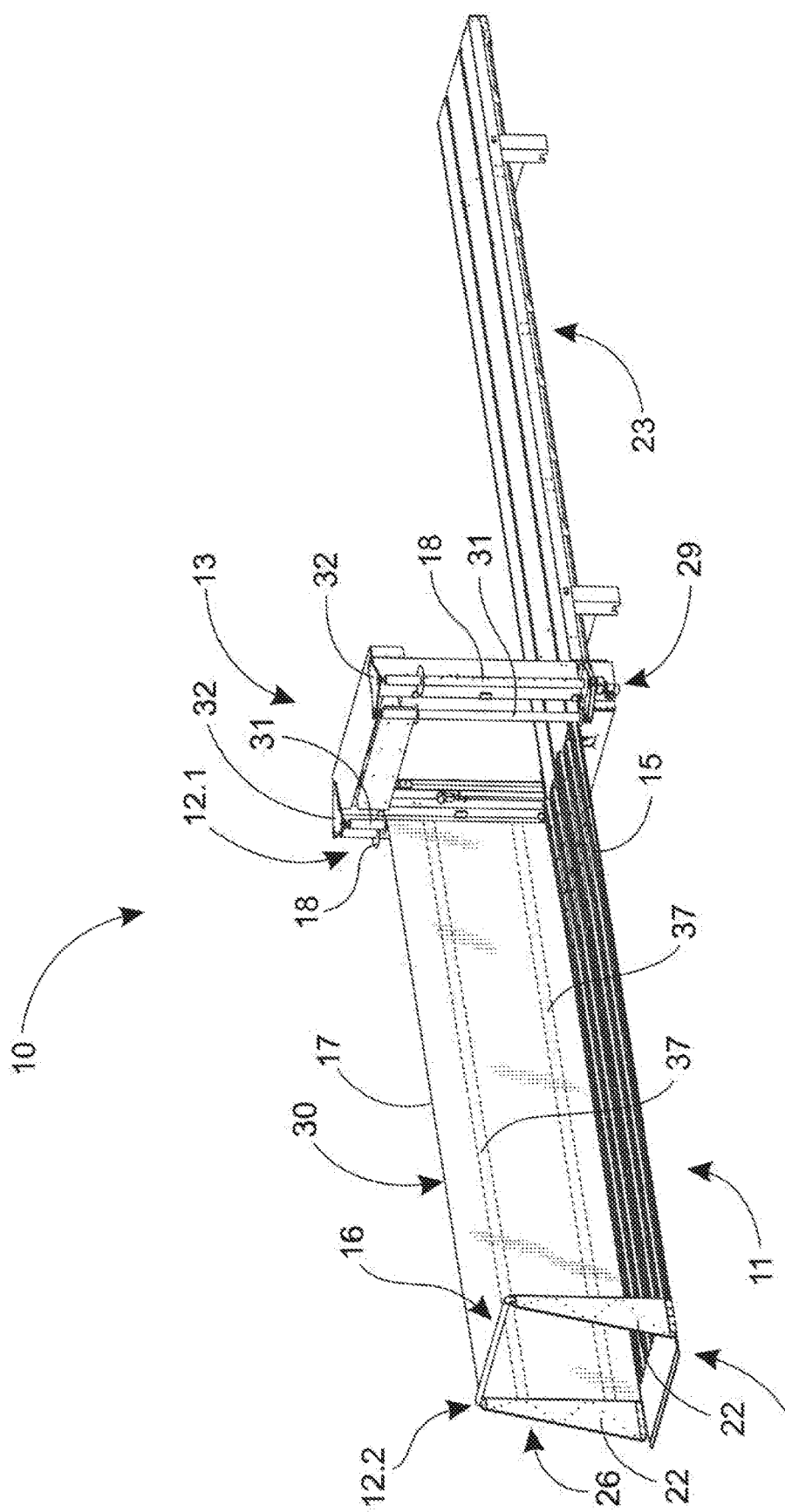
FIG. 5 shows an axonometric view of the arrangement shown in FIGS. 1-4, seen from the opposite direction, without the second protective wall, when it is in the cargo space.
Figure 6:
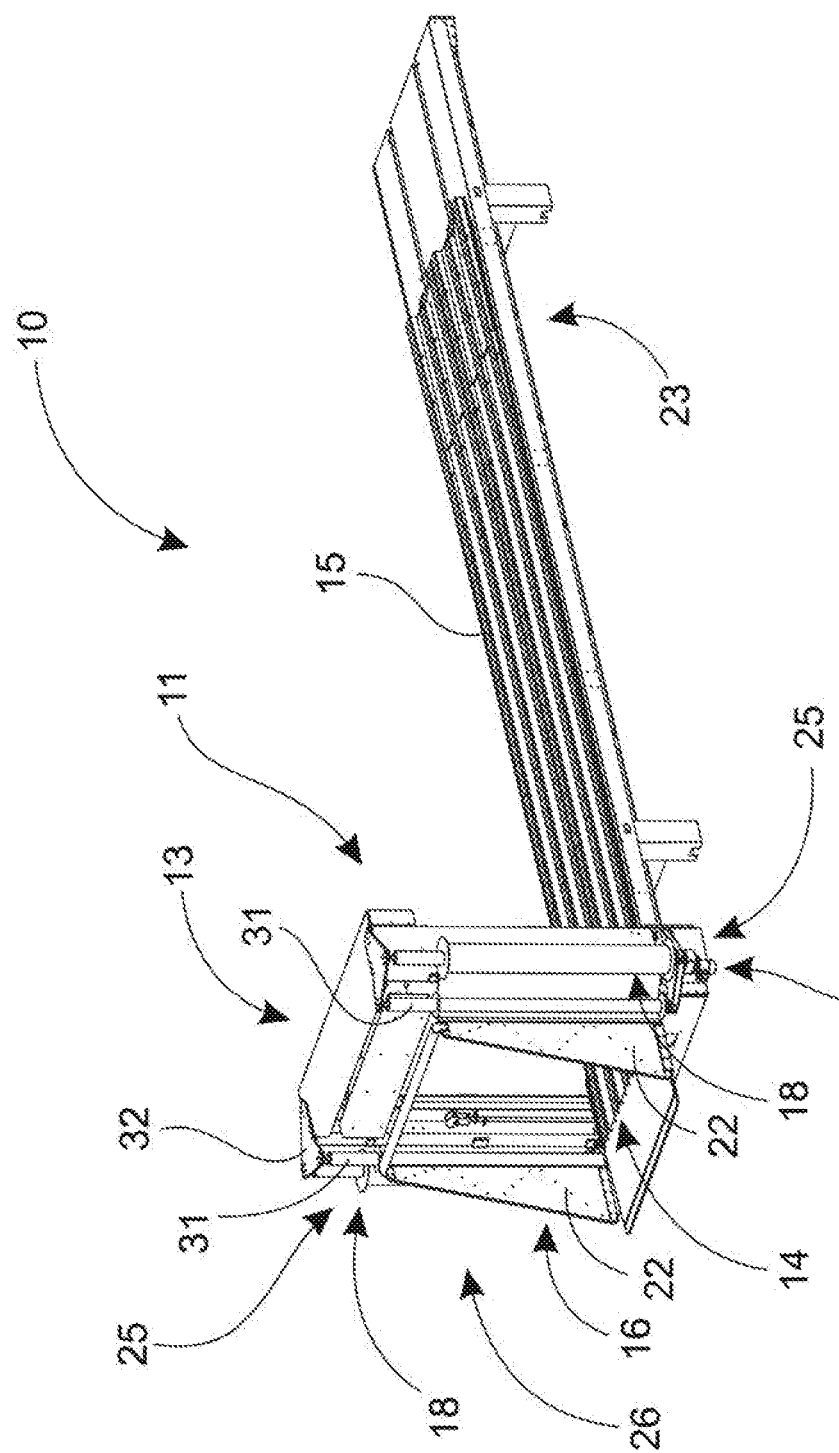

FIGS. 5 and 6 show an axonometric view of the arrangement without load units and the cargo space, seen from the opposite direction of to FIGS. 3 and 4. In FIG. 5, the transfer element 15 is in the position, in which it would be when being in the cargo space and in FIG. 6 when the protective wall 30 is reeled in. For reasons of clarity, the curtain 17 forming the protective wall 30 is shown on only one side of the transfer element 15. The reel means 25 can include at least one reel 18 and the operating device 29 arranged to act on it (FIGS. 3 and 4). Because the protective wall 30 can be reeled, the curtain 17 can enter the cargo space 41 along with the movement of the transfer element 15 when the cargo space 41 is being loaded. FIGS. 2 and 5 show a situation, in which the transfer element 15 is thus in the cargo space 41 when the curtain 17 is discharged from the reel 18 belonging to the reel means 25, where it has been reeled in. The curtain 17 then makes a protective wall 30 between the material being loaded and the side walls 42 of the cargo space 41. When the protective wall 30 is being formed, the operating device 29 belonging to the reel means 25 can be arranged to brake the discharge of the reeled in protective wall 30 from the reel 18. Thus a suitable tension can be maintained in the protective wall 30 for the entire duration of the transfer. The reel means 25 can equally be self-powered (for example, spring-assisted). The reel 18 can be formed in, as such, a known way by, for example, a core 33 (FIGS. 3 and 4). The curtain 17 can be reeled or discharged around it.

Correspondingly, when withdrawing the transfer element 15 from the cargo space 41 onto the base 23, the curtain 17 forming the protective wall 30 can be reeled back onto the reel 18 using the operating device 29 belonging to the reel means 25. In other words, the operating device 29 is arranged to reel the protective wall 30 onto the reel 18.

The reel means 25 can, in addition, includes at least one idler roll 31. It can be guiding the curtain 17 discharging from the reel 18. The idler roll can also be in connection with the gate 13. At the corners of the gate 13, there can be lugs 32 more generally for the reel means 25. In the case according to the embodiment, there is a reel 18 attached to the lugs 32 and also an idler roll 31 set in bearings at their ends.

The reel means 25 and particularly the reel 18 for reeling the curtain 17 belonging to it can have been arranged at at least one end 12.1, 12.2 of the protective wall 30. The curtain 17 can thus be arranged to reel at at least one end 12.1, 12.2. The reel means 25 are then in the fixed structures. Thus they do not move at all, for example, along with the protective wall 30 being formed or being reeled. This minimizes the possibility of damaging them.

In the case according to the embodiment, the reel means 25 are arranged at least in the gate 13 fitted in connection with the transfer apparatus 11, to which the curtain 17 is fitted at one end 12.1. The gate 13 provides a sturdy and protected attachment point for the reel means 25. According to a second embodiment, the reel means 25 can be, in addition to or instead of the gate 13 fitted in connection with the transfer element 15, also in the front part 14 of the transfer element 15. For this purpose, there can be a support 26 in the front part 14 of the transfer element 15. In the case according to the embodiment, the support 26 is formed by a frame 16, in which there are vertical pillars 22 (FIG. 7).

The material of the protective wall 30 can be, for example, an industrial-quality fabric. One example of this is a load-covering fabric, i.e. a so-called 'tarp'. The fabric can be durable and with sufficient stiffness properties, but nevertheless flexible when a loading acts on it.

Figure 7:
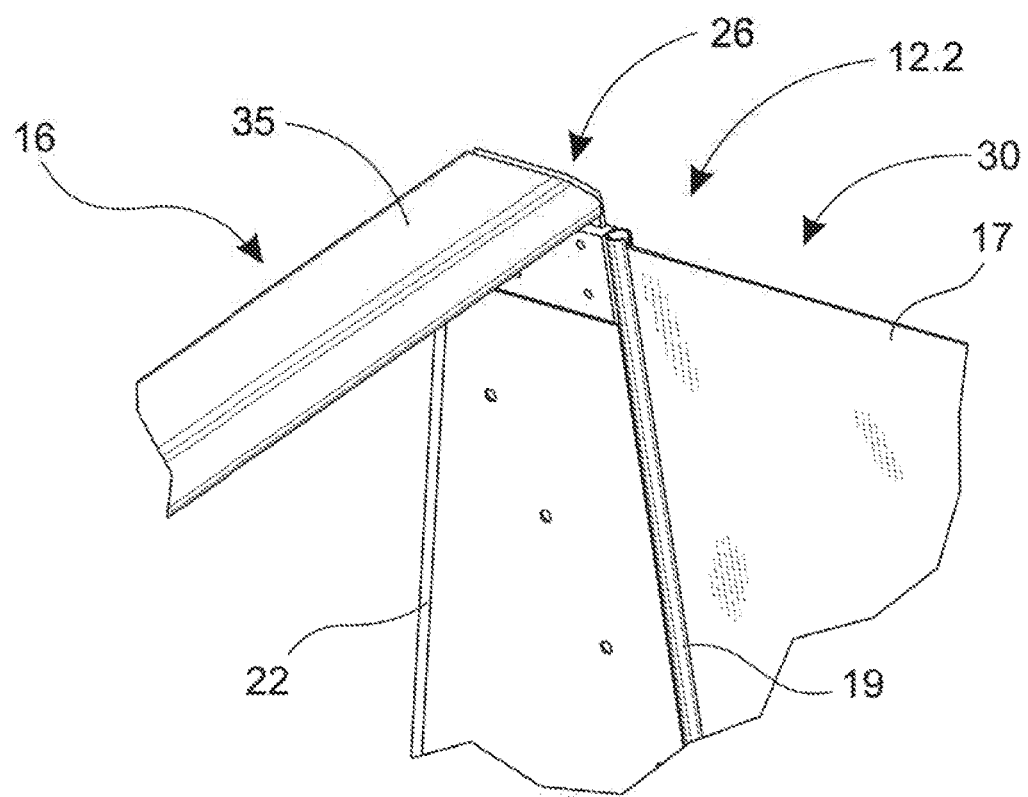
FIG. 7 shows a schematic example of the arrangement of the protective wall in the frame, seen from its upper edge.
Figure 8:
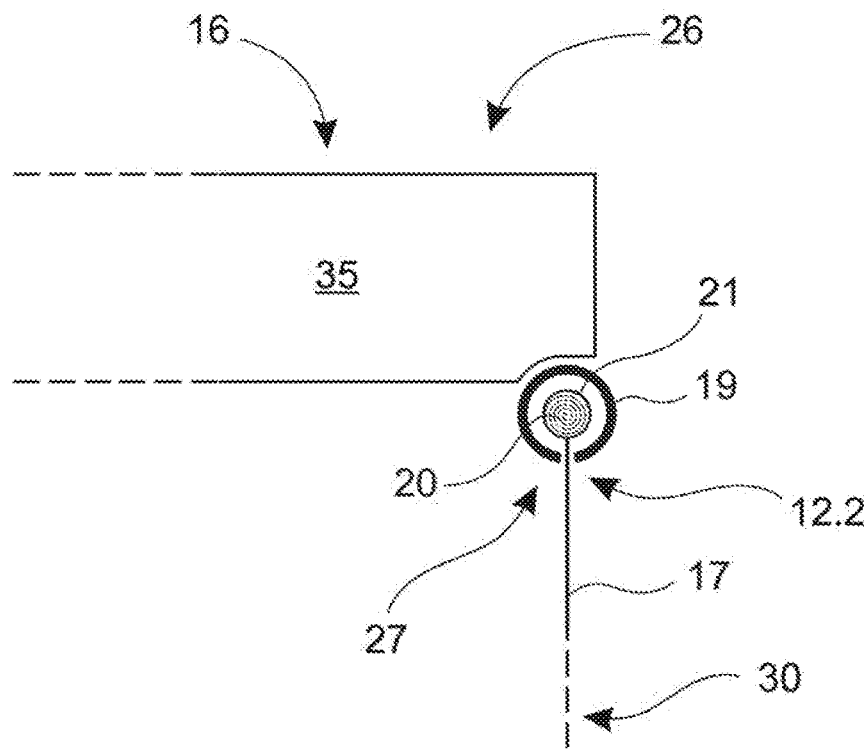
FIG. 8 shows an example of the arrangement of the end of the protective wall in the frame, seen from above.

FIG. 7 shows one schematic example of the arrangement of the curtain 17 with a frame 16 acting as a support 26 and FIG. 8 shows the rough principle of this, seen from above as a cross-section. FIG. 7 also shows one example of the construction of the frame 16. In the frame 16 there can be pillar structures 22 of two sides, which are connected above by a transverse support 35. Below, the pillar structures 22 can connect, for example, to the front part 14 of the transfer element 15. The structural thickness of the pillars 22 can be, for example, 20 mm. On the other hand, the frame 16 can also form its own independent structure, which is attached to the front part 14 of the transfer element 15.

The frame 16 acting as a support 26 can include an attachment arrangement 27 for the protective wall 30. It can be arranged to permit a small movement in the protective wall 30, a 'giving way' relative to the support 26. One way to implement this property is shown in FIG. 8. Both of the vertical pillars 22 of the frame 16 can have a split tube 19. In the tube 19 there can be a narrow gap in its longitudinal direction on the side of the curtain 17. Correspondingly, a rod 20 can be fitted to the end edge 12.2 of the curtain 17. A loop, inside with the rod 20 is set, can be sewn in the end edge 12.2 of the curtain 17. The end edge 12.2 of the curtain 17, together with the rod 20 are inside the tube 19 and the curtain 17 comes out of the tube 19 through the narrow gap arranged in the tube 19.

Figure 9:
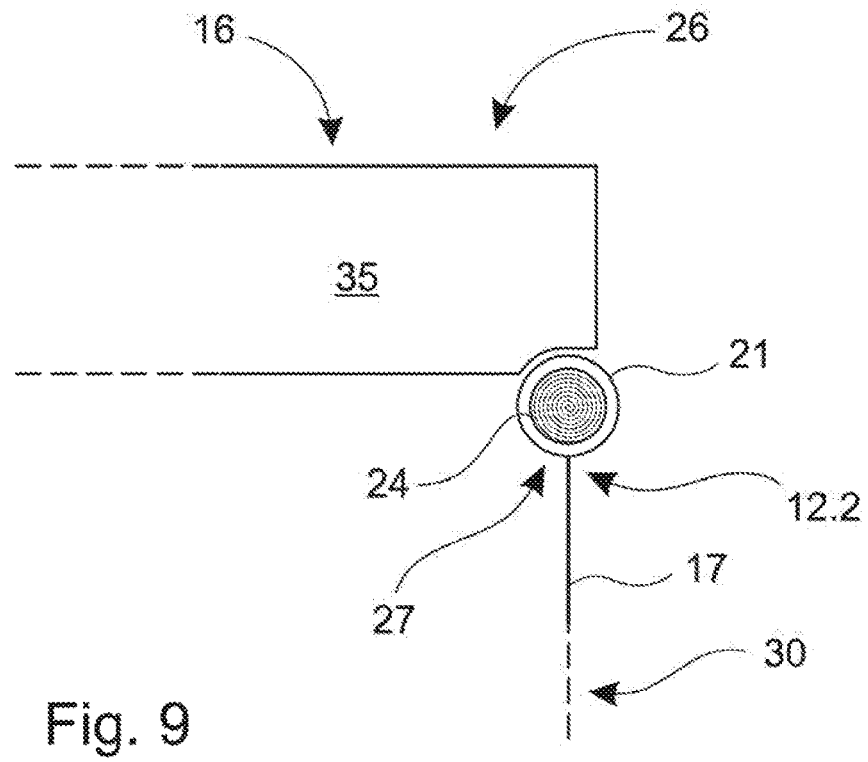
FIG. 9 shows a second example of the arrangement of the end of the protective wall in the frame, seen from above.

FIG. 9 shows yet another example of the attachment of the protective curtain 17 to the frame 16, when the arrangement 10 is viewed from above. In this case, there is a rod 24 (or alternatively also a tube) in connection with the pillar 22. Now there is a closed loop 21 in the end edge 12.2 of the curtain 17, which is around the rod 24 (or tube) installed in connection with the frame 16. In both embodiments, some suitable flexible element can also be used for attaching the curtain 17, instead of the tube 19 or rod 24. According to yet a third embodiment, the tarp 17 can be pressed onto the frame structure 16 using battens.

If necessary, the length of the curtain 17 can be adjusted/adapted in such a way that a tighter pull is achieved to the upper. According to one embodiment, the difference in length in the lower and upper edge of the curtain 17 in longitudinal direction, i.e. the direction of movement of the transfer element 15, can be, for example, about 40 mm.

The curtain 17 can be below very close to the inner surface of the floor 34 of the cargo space 41. The lower edge of the curtain 17 can be, for example, on the level of the upper surface of the transfer element 15, or, if the goods being loaded are on load pallets, for example on the level of the load pallets. The upper edge of the curtain 17 can even be close to the roof 36 of the cargo space 41. The height of the curtain 17 can depend on how high the load units 40 to be loaded are. The place of the curtain 17 in the cargo space 41 can be located in even a very narrow space between the load units 40 arranged on the transfer element 15 and the side walls 42 of the cargo space 41. More particularly, the location of the curtain 17 in the cargo space 41 can be between the edge of the transfer element 15 and the side walls 42 of the cargo space 41. Even more particularly, the place of the curtain 17 in the cargo space 41 can be immediately in the vicinity of the inner surface of the inner walls 42 of the cargo space 41. In this way, the available space for the load units 40 is maximized, and no waste space will remain in the cargo space 41.

In FIG. 2, the distance of the load units 40 from the side wall 42 of the cargo space 41 is shown as being exaggeratedly large, for reasons of clarity. In reality, this gap can be very narrow. In that case, at least some of the load units 40 may at least strike or even rub against the inner surface of the side wall 42 of the cargo space 41 for most of the distance they travel. The protective wall 30 then runs between the side wall 42 and the load units 40. It can be at least locally in contact simultaneously with even both.

In addition to the arrangement, the invention also relates to an apparatus for forming a protective wall 30 in a cargo space 41. The cargo space 41 is arranged to be loaded, for example, using a transfer apparatus 11 like that described above, which includes a transfer element 15. The transfer element 15 is arranged to move, together with the load units 40 to be arranged on it, into the cargo space 41 and back out of it, while the load units 40 remain in the cargo space 41. The apparatus is arranged to form at least one protective wall 30, which can be formed between the structure 42 defining the cargo space 41 and the load units 40.

The apparatus includes means 28 for forming the protective wall 30 between the structure 42 defining the cargo space 41 and the load units 40. The forming of the protective wall 30 is synchronized with the movement of the transfer element 15. Such an apparatus, which is described, an example above in the description portion of the present application, can be easily arranged, for example, in already existing transfer apparatuses 11, without any great need to modify the transfer element 15. The apparatus can include, for example, one curtain 17, at least one reel means 25, and a frame 16 acting as a support 26. The frame 16 is arranged in the front part 14 of the transfer element 15 of the transfer apparatus 11 and the reel means 25, for example, in the gate 13 of the transfer apparatus 11. The curtain 17 forming the protective wall 30 is arranged between the reel means 25 and the frame 16. After electrical connections are made to the reel means 25, the apparatus is ready for operation for use in connection with the transfer apparatus 11.

In addition to the arrangement 10 and apparatus, the invention also relates to a method for loading a cargo space 41. In the following, the method is described with reference to FIGS. 1 and 2. In order to implement the method the transfer apparatus 11 is formed of a gate 13, a transfer element 15, which has a front part 14 and arranged to move through the gate 13. The load units 40 can be arranged on top of the transfer element 15. At its point of use, the transfer apparatus 11 is arranged in such a way that the gate 13 of the transfer apparatus 11 can be arranged at the mouth 43 of the cargo space 41 to be loaded. The transfer apparatus 11 is then fitted to the loading-bay structure in such a way that its base 23 is on the bay and the gate 13 is in the immediate vicinity of the edge of the bay, to which the mouth 43 of the cargo space 41 can be brought.

Before the load can be loaded into the cargo space 41, the load units 40 are arranged on the transfer element 15 of the transfer apparatus 11 outside the cargo space 41. Due to the implementation of the transfer apparatus 11, this takes place on the opposite side of the gate 13 relative to the cargo space 41, i.e. on top of the base 23. The load units 40 are then arranged on the transfer element 15 of the transfer apparatus 11 ready waiting to be loaded into the cargo space 41. The cargo space 41 can be ready waiting for loading or then the load units 40 can be brought already to the transfer element 15 to await loading, before the cargo space 41 arrives to the connection of the transfer apparatus 11.

FIG. 1 shows a situation, in which the load units 40 and the cargo space 41 are ready for loading. The load units 40 are on top of the transfer element 15, which is outside the cargo space 41. It is then on top of the base 23 arranged for it. After this, the load units 40 can be moved by the transfer element 15 from on top of that base 23 through the gate 13 into the cargo space 41. A protective wall 30 is formed between the structure 42 defining the cargo space 41 and the load units 40. The protective wall 30 is formed as the load units 40 are being moved into the cargo space 41. In this way, the danger of damage to the protective wall 30, which might exist for it if it was already in a place arranged in front of the transfer apparatus 11 for the transportation means forming the cargo space 41.

According to one embodiment, the protective wall 30 can be formed between the gate 13 of the transfer apparatus 11 and the front part 14 of the transfer element 15. Thus, the protective wall 30 is formed only in the cargo space 41 and it has no structures extending, for example, into the loading area of the transfer element 15, where work takes place when the load units 40 are brought, for example, on a fork-lift truck, on top of the transfer element 15. This makes the solution obstacle-free. It both accelerates loading operations and also makes it less liable to damage, compared, for example, to a situation in which the protective wall 30 would extend to the area of the base 23, where, for example, fork-lift trucks operate.

When the transfer element 15 has been pushed into intended manner into the cargo space 41 with the load units 40 being still on top of the transfer element 15, it can be pulled out from there while the load units 40 remain in the cargo space 41. Here, it is possible to utilize, in an as such known manner, for example, closing and/or buffering structures (not shown) arranged in the gate 13. The gate 13 is not in the cargo space 41 when loading is performed. When the transfer element 15 is pulled out of the cargo space 41, it slides out in an as such known manner from under the load units 40. The load units 40 which have been moved into the cargo space 41 and left there remain on top of the floor structure of the cargo space 41. The protective wall 30 too returns with the movement of the transfer element 15 withdrawing from the cargo space 41. The loading process ends in the situation shown in FIG. 3 (from which the cargo space is missing). The frame 16 acting as a support 26 of the front edge 12.1 of the curtain 17 forming the protective wall 30 is then once again in connection with the gate 13, as it was in the initial situation according to FIG. 1. The front part 14 of the transfer element 15 is then also in connection with the gate 13.

According to one embodiment, when moving the load units 40 on the transfer element 15 into the cargo space 41, the protective wall 30 is formed in the cargo space 41 by discharging it from the reeled-in position. Correspondingly, when moving the transfer element 15 out of the cargo space 41, the protective wall 30 is reeled in. This makes the implementation of the protective wall 30 compact. The protective wall 30 is only open when it is needed.

According to one embodiment, when discharging the protective wall 30 from the reeled-in position, it can be braked in connection with the discharging. This can take place, for example, by means of the operating device 29 belonging to the reel means 25. Reeling in the protective wall 30 can also take place with the aid of an operating device, using the same operating device 29 by which braking was performed. For this purpose, the arrangement and apparatus include automation and control logic which are connected to the operation of the transfer apparatus 11 and the transfer element 15.

Often, the protective wall 30 is formed over the entire main length of the cargo space 41. The length of the protective wall 30 can then be, at its greatest, as much as more than 10 meters. For this purpose, one or more stiffeners 37 (FIG. 5) can be fitted to the curtain 17, more generally the protective wall 30. By using them, it is possible to prevent the possible slumping of the protective wall 30 in the unsupported interval, which can be between the reel 18 and the support 26. In the case according to the embodiment, the stiffeners 37 run horizontally, but they can equally run in other directions too, for example, vertically. The stiffeners 37 can be, for example, strips or battens, which are, for example, sewn to the surface of, or even inside the curtain 17. The material of the stiffeners 17 can be, for example, flexible carbon fibre. By means of the stiffeners 37, the curtain 17 can be prevented from slumping when it is the reeled open position, when the length of the curtain 17 is several meters, or even more than 10 meters. In addition, for example in the upper edge of the curtain 17 there can be a rubber band or similar over at least part or even all of its length. This can also be used to keep the upper edge of the curtain 17 tensioned.

The implementation according to the embodiment of the protective wall 30 formed from, for example, a curtain 17 and a support 26, is light and thin compared to known permanently arranged, for example, sheet-like protective walls. The transfer apparatus 11 and the transfer element 15 demand large forces to move heavy loads into the cargo space 41. The lightness and simplicity in movement required of the structures forming the protective wall 30 are then emphasized, especially if it is operated by the same power source creating motive power as the transfer element 15. The relatively lightly constructed curtain 17 makes the implementation in this sense very advantageous. It is durable and sufficient to protect the load units 40 and also the cargo space 41 from damage. Being flexible and durable, the tarp conforms well, for example, to damages in the inner surface of the side wall 42 of the cargo space 41, for example, dents and tears, while at the same time protecting the load units 40 being loaded. In addition, if damage possibly occurs, the curtain 17 can also be easily repaired or replaced with a new one. The protective wall 30 implemented by a curtain 17 also does not take up much useful space from the cargo space 41, to that a large volume remains for the load units 40 and little empty space remains in the loaded cargo space 41. In other words, more cubic meters are obtained for effective use.

It must be understood that the above description and the related figures are only intended to illustrate the present invention. The invention is thus in no way restricted to only the embodiments disclosed or stated in the Claims, but many different variations and adaptations of the invention, which are possible within the scope on the inventive idea defined in the accompanying Claims, will be obvious to one skilled in the art.

The invention claimed is:

1. An arrangement for loading a cargo space, comprising:
a transfer apparatus including a gate;
a transfer element as part of the transfer apparatus, the transfer element including a front part, and the transfer element being arranged to move, together with load units to be arranged on top of the transfer element, into the cargo space and back out of the cargo space leaving the load units in the cargo space;
at least one curtain element for forming a protective wall between a structure defining the cargo space and the load units, the protective wall being formed by the transfer apparatus between the gate and the front part;
at least one reel means for reeling in the curtain element to a reeled-in position and discharging the curtain element from the reeled-in position by means of a movement effect created by the transfer element; and
a support, arranged in connection with the front part of the transfer element, to which one end of the protective wall is attached.

2. The arrangement according to claim 1, wherein the reel means comprise a reel and an operating device arranged to act on the reel.

3. The arrangement according to claim 2, wherein the operating device is arranged to reel in the protective wall onto the reel.

4. The arrangement according to claim 2, wherein when forming the protective wall, the operating device is arranged to brake discharge of the protective wall from the reeled-in position on the reel.

5. The arrangement according to claim 1, wherein the reel means are arranged in at least one end of the protective wall.

6. The arrangement according to claim 1, wherein the reel means are arranged at least in the gate arranged in connection with the transfer apparatus.

7. The arrangement according to claim 1, wherein the support comprises an attachment arrangement for the protective wall, arranged to permit movement of the protective wall relative to the support.

8. The arrangement according to claim 1, wherein the protective wall is formed of an industrial-quality fabric.

9. The arrangement according to claim 1, wherein one or more stiffeners are fitted to the protective wall.

10. The arrangement according to claim 1, wherein
the gate of the transfer apparatus can be arranged in a mouth of the cargo space; and
the load units can be arranged on the transfer element of the transfer apparatus on an opposite side of the gate relative to the cargo space.

11. A method for loading a cargo space, comprising steps of:
arranging load units on top of a transfer element outside the cargo space, the transfer element including a front part;
moving the load units on the transfer element through a gate into the cargo space, after which the transfer element is moved out of the cargo space while the load units remain in the cargo space;
forming a protective wall between a structure defining the cargo space and the load units while moving the load units into the cargo space by discharging the protective wall from a reeled-in position when moving the load units on the transfer element into the cargo space, and reeling the protective wall in when moving the transfer element out of the cargo space; and
forming the protective wall between the gate and the front part of the transfer element with a support arranged in connection with the front part of the transfer element, to which one end of the protective wall is attached.

12. The method according to claim 11, further comprising:
braking the protective wall in connection with the discharging of the protective wall from the reeled-in position; and
reeling the protective wall in with an operating device.

13. The method according to claim 11, further comprising:
arranging the gate at a mouth of the cargo space; and
arranging the load units on the transfer element on an opposite side of the gate relative to the cargo space.

* * * * *